United States Patent
Wilson

[11] Patent Number: 6,116,349
[45] Date of Patent: Sep. 12, 2000

[54] VEGETATION CUTTER WITH GUIDE

[75] Inventor: Michael Wilson, Durham, United Kingdom

[73] Assignee: Black & Decker, Inc., Newark, Del.

[21] Appl. No.: 08/876,415

[22] Filed: Jun. 16, 1997

Related U.S. Application Data

[63] Continuation of application No. 08/684,505, Jul. 19, 1996, abandoned, which is a continuation of application No. 08/314,175, Sep. 28, 1994.

[30] Foreign Application Priority Data

Jan. 26, 1993 [GB] United Kingdom .................... 9401503
Sep. 30, 1993 [GB] United Kingdom .................... 9320124

[51] Int. Cl.[7] .................................................. A01D 34/47
[52] U.S. Cl. ............................ 172/14; 172/16; 56/12.7; 56/17.4
[58] Field of Search .................................... 56/17.1, 17.2, 56/16.7, 17.4, 12.7; 172/17, 13, 14, 16; 30/DIG. 5, 296.31, 275.4

[56] References Cited

U.S. PATENT DOCUMENTS

| | | | |
|---|---|---|---|
| 2,630,747 | 3/1953 | Mintz | 172/17 X |
| 2,708,335 | 5/1955 | Newton | 172/14 X |
| 3,453,732 | 7/1969 | Wilkin | 30/296.1 |
| 3,734,196 | 5/1973 | Mangum | 172/16 |
| 3,872,930 | 3/1975 | Campbell | 172/17 X |
| 4,972,586 | 11/1990 | Matsumoto et al. | 30/296.1 X |
| 4,981,012 | 1/1991 | Claborn | 56/17.1 X |
| 5,009,369 | 4/1991 | Iwaszkowiec | 172/17 X |
| 5,077,898 | 1/1992 | Hartwig | 30/DIG. 5 |
| 5,107,665 | 4/1992 | Wright | 30/275.4 X |
| 5,351,762 | 10/1994 | Bean | 172/17 |

FOREIGN PATENT DOCUMENTS

| | | | |
|---|---|---|---|
| 3121032 | 12/1982 | Germany . | |
| 711706 | 7/1954 | United Kingdom | 30/296.1 |
| 2255265 | 11/1992 | United Kingdom . | |

*Primary Examiner*—Christopher J. Novosad
*Attorney, Agent, or Firm*—Ajay K. Gambhir

[57] ABSTRACT

A device for trimming the edge of a lawn device comprises a rotary cutter which, in use, rotates about an axis which is substantially horizontal with respect to the ground. The device further comprises a guide which is mounted to extend, in use, in a substantially vertical downward direction to a depth greater than or substantially equal to the depth to which the rotary cutter extends. The guide is preferably mounted to extend, in use, in a substantially vertical downward direction to a depth greater than or substantially equal to the depth to which the rotary cutter extends.

3 Claims, 3 Drawing Sheets

VEGETATION CUTTER WITH GUIDE

This application is a continuation of continuation application Ser. No. 08/684,505, filed Jul. 19, 1996 abandoned, which is a continuation of application Ser. No. 08/314,175, filed Sep. 28, 1994.

BACKGROUND OF THE INVENTION

The present invention relates to a device for trimming the edge of a lawn, which device comprises a rotary cutter which, in use, rotates about an axis which is substantially horizontal with respect to the ground. It has particular relevance to devices which trim by means of a filament or strip that is rotated rapidly about a substantially horizontal axis; such devices may be adjustable between two alternative modes of cutting, in one of which the filament is rotated about a substantially horizontal axis, which mode is particularly adapted for edging, and a second mode in which the filament is rotated about a substantially vertical axis, which mode is particularly adapted for general vegetation cutting.

It is a disadvantage of known devices for trimming the edge of a lawn that it is difficult for the user to line up the trimmer with the lawn edge, and to maintain this alignment during trimming. Various proposals have been made to provide guide means to overcome this difficulty, but none of these have proved completely satisfactory. It is a further disadvantage of edge trimmers of the rotating line type, that excessive line wear and breakage may result from the impact of the line against the base of shallow edges.

In devices of the type which are adjustable between the two alternative modes of cutting, as discussed above, there is a further problem in that the edging guide must not interfere with efficient cutting performance in the general cutting mode, when the line is rotating about a vertical axis, especially when the device is being used for trimming close to an obstacle such as a tree or a wall.

BRIEF SUMMARY OF THE INVENTION

It is an object of the present invention to provide a device for trimming the edge of a lawn in which the above disadvantages are reduced or substantially obviated.

The present invention provides a device for trimming the edge of a lawn, which device comprises a rotary cutter which, in use, rotates about an axis which is substantially horizontal with respect to the ground, characterised in that the device further comprises a guide which is mounted to extend, in use, in a substantially vertical downward direction to a depth greater than or substantially equal to the depth to which the rotary cutter extends.

The present invention further provides a device for trimming the edge of a lawn, which device comprises a cutting line which, in use, rotates about an axis which is substantially horizontal with respect to the ground, characterised in that the device further comprises a guide which is mounted to extend, in use, in a substantially vertical downward direction to a depth greater than or substantially equal to the predetermined maximum length (as herein defined) to which the cutting line is designed to extend.

The device according to the invention preferably comprises i) a housing rotatable about an axis which is, when the device is in use for edge trimming, substantially horizontal with respect to the ground and;

ii) storage means within the housing storing a supply of flexible line having an end extending to a predetermined length through an aperture in the housing into a cutting plane normal to the axis, characterised in that the device further comprises a guide which is mounted to extend, when the device is in use for edge trimming, in a substantially vertically downward direction to a radius substantially equal to or greater than the predetermined length of the cutting line.

Devices of this type are increasingly provided with an automatic feed system by means of which replacement line is fed from storage means when the length of line extending from the storage means is less than a predetermined length, the feed system permitting line to feed by allowing relative angular rotation between the storage means and the drive mechanism.

The predetermined maximum length to which the cutting line is designed to extend is determined differently, depending on the feed system with which the device is equipped. In the case of a manual or semi-automatic feed system, in which feeding is initiated by the operator, the maximum length is generally set by a cutting blade provided on a guard provided to protect the operator.

In the case of a fully automatic feed system, in which feeding is initiated automatically by detecting that the cutting length has fallen below a predetermined minimum (the theoretical minimum cutting length), the predetermined maximum cutting length to which the cutting line is designed to extend is equal to the sum of the theoretical minimum cutting length and the maximum amount fed out in a feed cycle. In practice however, the actual amount fed may be less than the maximum amount, since it varies depending on the amount of line actually on the storage spool.

In an alternative embodiment of device according to the invention, the guide is mounted to be displaceable between a first operative position in which it extends, when the device is in use for edge trimming, in a substantially vertically downward direction to a radius substantially equal to or greater than the predetermined length of the cutting line, and a second inoperative position. Suitable materials for the guide include steel wire, cast metal, in particular cast aluminium, or cast plastics in particular polycarbonate or polypropylene.

BRIEF DESCRIPTION OF THE SEVERAL VIEWS OF THE DRAWINGS

A first and a second embodiment of a vegetation cutter according to the invention will now be further described with reference to the accompanying drawings, in which.

DETAILED DESCRIPTION

Figure 1:
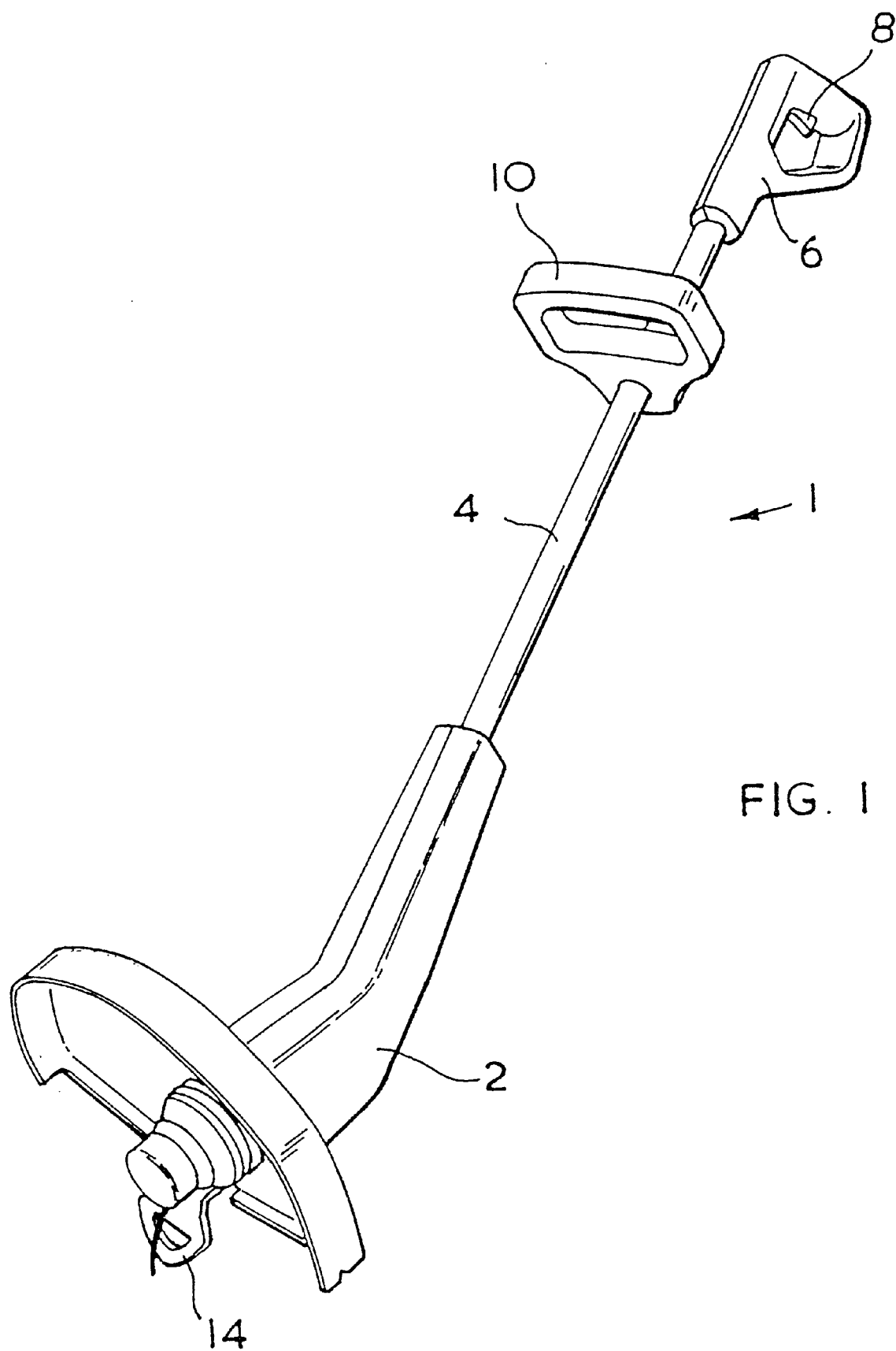
FIG. 1 is a perspective view of a first embodiment of a string trimmer in lawn edging mode.
Figure 2:
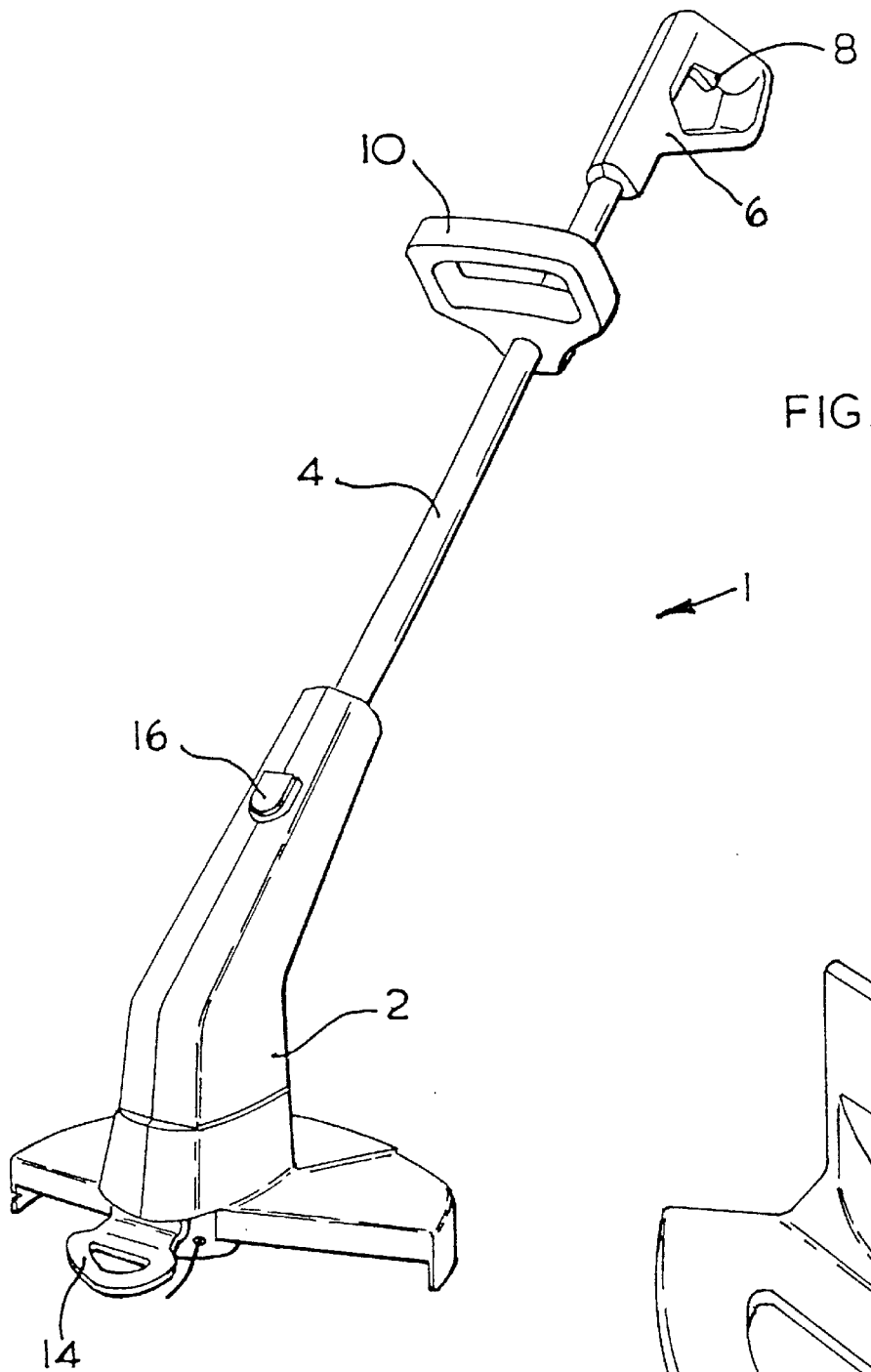
FIG. 2 is a perspective view of the string trimmer of FIG. 1 in trimming mode.

As can be seen from FIGS. 1 and 2, a trimmer (1) comprises a lower housing (2) connected by a shaft (4) to a handle assembly (6). The handle assembly (6) provides a switch (8) for selectively supplying electrical power to an electric motor (not shown) carried within the housing (2). For two-handed operation of the trimmer, a secondary handle (10) is mounted on the shaft (4). The lower housing (2) carries a cutting head (not shown) rotatable about an axis passing through the housing (2) and the cutting line (12) extends into a cutting plane which is substantially perpendicular to the axis of rotation of the head the housing (2). A release button (16) is fitted at the junction of the shaft (4) and lower housing (2).

As can be seen by comparison of FIGS. 1 and 2, the device can be adjusted from the edging mode (FIG. 1) to the trimming mode (FIG. 2) by rotation of the lower housing (2) through 900°. In the embodiment shown in the drawings, the release button (16) is depressed to release the mechanism (not shown) which locks the shaft (4) and housing (2) against rotation relative to each other, in order to change from one mode to the other.

Figure 3:
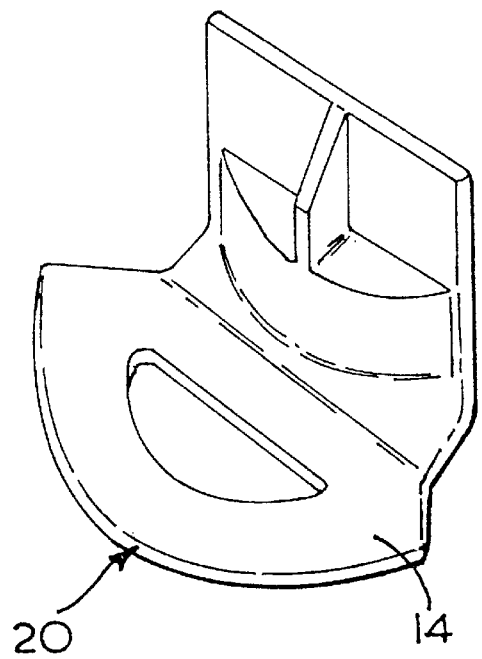
FIG. 3 is a perspective view of a guide of the type fitted to the trimmer of FIGS. 1 and 2.

As can be seen from FIG. 3, the guide (14) comprises a substantially flat metal plate with shaped leading edge (20) to encourage free movement of the guide against the edge of the lawn. The guide (14) is retained in the housing (2) either by means of entrapment or secured by screws.

Figure 4:
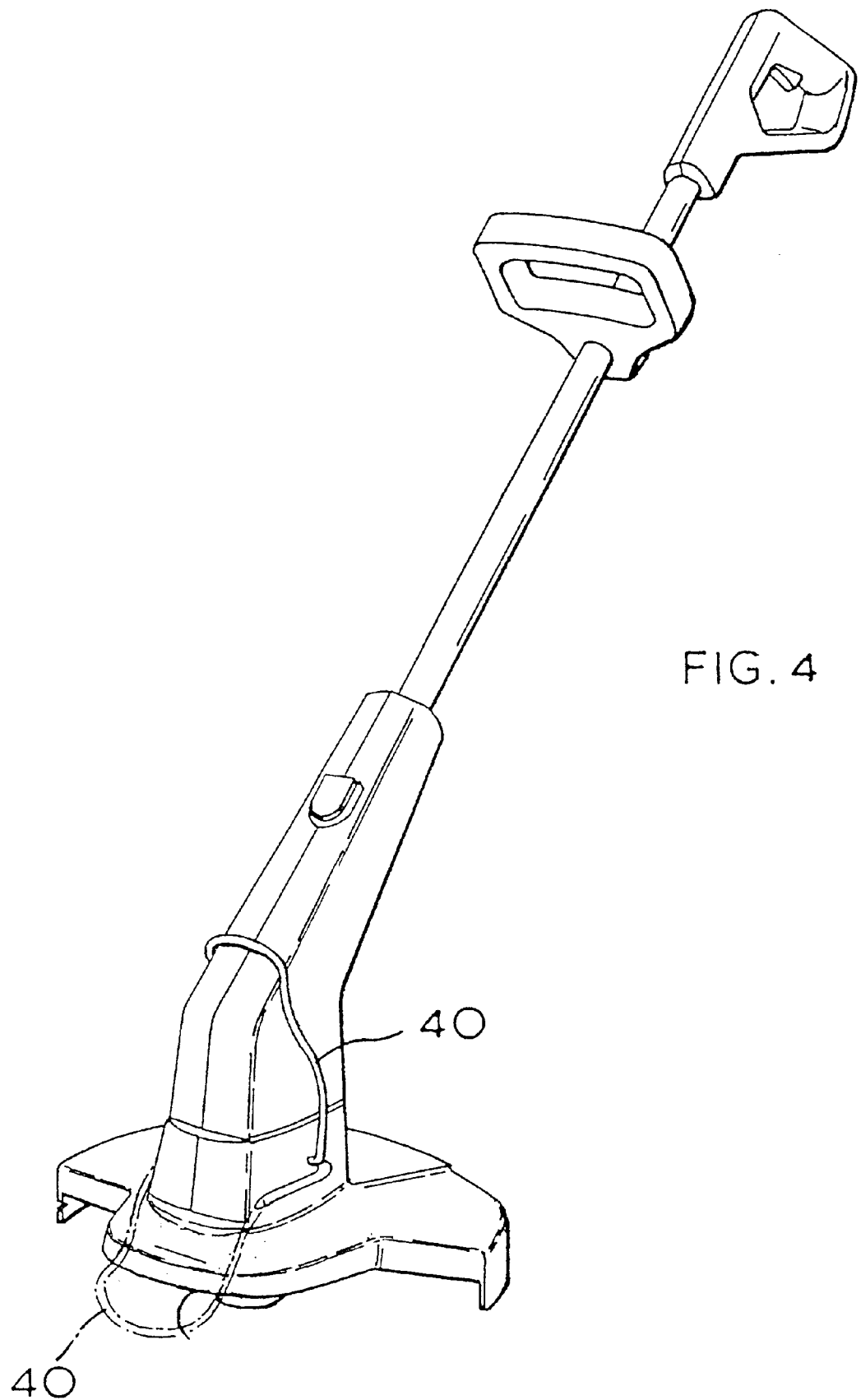
FIG. 4 is a perspective view of a second embodiment of a string trimmer in trimming mode.

In the alternative embodiment shown in FIG. 4, the guide (40) is a rigid loop-like structure and is shown in an inoperative position, in which it is located in a suitably shaped groove in the housing of the cutter head. It can be released from this groove, and pivoted into an operative position in which it extends in a similar manner as the guide of the embodiment of FIGS. 1 to 3.

What is claimed is:

1. A device for trimming the edge of a lawn, said device comprising:

a shaft having first and second ends;

at least one handle located near the first end of said shaft;

a lower housing rotatably attached to the second end of said shaft;

wherein rotation of said housing changes said device from an edge mode to a trim mode;

a flexible line for cutting vegetation located within said housing and extending into a cutting plane;

a rigid loop-like guide affixed to said device near said housing; and a groove in said housing in which said guide is located in an inoperative position, wherein when in an operative position, the guide extends out of the groove, such that when the guide is in an operative position while the device is in the edge mode, the guide extends substantially vertically downward toward the ground.

2. A device as claimed in claim 1, wherein said guide pivots from the inoperative position to the operative position, such that said guide may be moved to the inoperative position when said device is in the trim mode.

3. A device as claimed in claim 2 wherein said guide, in the operative position, extends substantially vertically a distance that is substantially equal to or greater than the flexible line.

* * * * *